US012557941B2

(12) United States Patent (10) Patent No.: US 12,557,941 B2
Colston et al. (45) Date of Patent: *Feb. 24, 2026

(54) SELF-CLEANING GRILLING DEVICES

(71) Applicant: Traeger Pellet Grills, LLC, Salt Lake City, UT (US)

(72) Inventors: Michael V. Colston, Salt Lake City, UT (US); Daniel A.C. Altenritter, Layton, UT (US); Daniel W. Sluder, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/805,496

(22) Filed: Jun. 6, 2022

(65) Prior Publication Data

US 2022/0296043 A1 Sep. 22, 2022

Related U.S. Application Data

(63) Continuation of application No. 16/362,327, filed on Mar. 22, 2019, now Pat. No. 11,350,791.

(60) Provisional application No. 62/648,216, filed on Mar. 26, 2018.

(51) Int. Cl.
*A47J 37/07* (2006.01)
*A47L 7/00* (2006.01)
*B08B 9/08* (2006.01)

(52) U.S. Cl.
CPC ....... *A47J 37/0786* (2013.01); *A47J 37/0704* (2013.01); *A47L 7/00* (2013.01); *B08B 9/08* (2013.01)

(58) Field of Classification Search
CPC ..... A47J 37/0704; A47J 37/0786; A47L 7/00; B08B 9/08; Y02A 40/928
See application file for complete search history.

(56) References Cited

U.S. PATENT DOCUMENTS 165,943 A * 7/1875 Moore ..................... F23H 9/00
126/180
1,156,773 A * 10/1915 Gordon ............... A47J 37/0763
126/9 R
1,611,018 A * 12/1926 Fuller ................... F24B 15/007
144/252.2

(Continued)

FOREIGN PATENT DOCUMENTS

CA 3036060 A1 9/2019
CN 2314257 Y 4/1999
(Continued)

OTHER PUBLICATIONS

Great Britain Search Report from Application No. 1904197, mailed May 28, 2019, 9 pages.

(Continued)

*Primary Examiner* — Michael G Hoang
*Assistant Examiner* — Logan P Jones
(74) *Attorney, Agent, or Firm* — TraskBritt

(57) ABSTRACT

A self-cleaning solid fuel grilling device comprises a grilling cavity and a firepot disposed within the grilling cavity. In addition, the embodiment includes an evacuation cavity disposed beneath the firepot. The evacuation cavity is in communication with the grilling cavity.

16 Claims, 13 Drawing Sheets

(56)                References Cited

U.S. PATENT DOCUMENTS

| 1,887,768 | A | * | 11/1932 | Maloney ................... F23J 1/00 |
| | | | | 110/165 R |
| 1,983,709 | A | | 12/1934 | Schmidt |
| 2,090,622 | A | | 8/1937 | Cruikshank |
| 2,679,251 | A | * | 5/1954 | Simmer .................. A24F 13/14 |
| | | | | 131/245 |
| 2,748,691 | A | * | 6/1956 | Johnson ................. F24B 1/003 |
| | | | | 126/25 R |
| 3,173,425 | A | * | 3/1965 | Gregory ................. A24F 13/14 |
| | | | | 131/174 |
| 3,223,077 | A | | 12/1965 | Tsakos |
| 3,251,345 | A | * | 5/1966 | Joseph ...................... F23G 5/46 |
| | | | | 122/2 |
| 3,521,549 | A | | 7/1970 | Funke |
| 3,721,177 | A | | 3/1973 | Booker |
| 4,363,674 | A | | 12/1982 | Fullenwider |
| 4,507,546 | A | | 3/1985 | Fortune et al. |
| 4,770,157 | A | | 9/1988 | Shepherd et al. |
| 4,881,472 | A | | 11/1989 | Stromberger et al. |
| 5,123,360 | A | | 6/1992 | Burke et al. |
| 5,168,860 | A | | 12/1992 | Kibourian |
| 5,517,902 | A | | 5/1996 | Boston |
| 5,582,094 | A | | 12/1996 | Peterson et al. |
| 5,676,045 | A | | 10/1997 | Faraj |
| 6,223,737 | B1 | | 5/2001 | Buckner |
| 7,900,553 | B1 | | 3/2011 | Maurin |
| 8,716,634 | B2 | | 5/2014 | Biller |
| 9,140,448 | B2 | | 9/2015 | Freeman |
| 9,289,096 | B2 | | 3/2016 | Barkhouse et al. |
| 9,603,484 | B2 | | 3/2017 | Cleveland et al. |
| 9,759,429 | B2 | | 9/2017 | Tucker |
| 9,814,354 | B2 | | 11/2017 | McAdams et al. |
| 2007/0137634 | A1 | | 6/2007 | Traeger et al. |
| 2009/0107478 | A1 | | 4/2009 | Demars et al. |
| 2009/0136638 | A1 | | 5/2009 | Fujie et al. |
| 2009/0148801 | A1 | | 6/2009 | Wedermann |
| 2011/0048398 | A1 | | 3/2011 | Christensen et al. |
| 2011/0073101 | A1 | | 3/2011 | Lau et al. |
| 2014/0318524 | A1 | * | 10/2014 | Measom ............. A47J 37/0704 |
| | | | | 126/25 R |
| 2014/0326233 | A1 | | 11/2014 | Traeger |
| 2014/0360387 | A1 | | 12/2014 | Bogdon |
| 2016/0183722 | A1 | | 6/2016 | Fisher |
| 2016/0327263 | A1 | | 11/2016 | Traeger |
| 2017/0055549 | A1 | | 3/2017 | Jung |
| 2017/0164783 | A1 | | 6/2017 | Sauerwein et al. |
| 2017/0176018 | A1 | | 6/2017 | Traeger |
| 2017/0196400 | A1 | | 7/2017 | Colston |
| 2017/0238565 | A1 | | 8/2017 | Giebel et al. |
| 2017/0238566 | A1 | | 8/2017 | Smith et al. |
| 2017/0367515 | A1 | | 12/2017 | Cornelissen et al. |
| 2018/0008093 | A1 | | 1/2018 | Parker et al. |
| 2018/0110367 | A1 | | 4/2018 | Baker |
| 2018/0296031 | A1 | * | 10/2018 | Terrell, Jr. .......... A47J 37/0704 |
| 2019/0008321 | A1 | | 1/2019 | Allmendinger |
| 2019/0078806 | A1 | | 3/2019 | Looft |
| 2019/0162411 | A1 | | 5/2019 | Choi et al. |

FOREIGN PATENT DOCUMENTS

| CN | 203744267 | | 7/2014 |
| CN | 204245967 | U | 4/2015 |
| CN | 104921617 | A | 9/2015 |
| CN | 107296519 | A | 10/2017 |
| CN | 207049956 | U | 2/2018 |
| DE | 102016211043 | A1 | 12/2017 |
| EP | 0947903 | A1 | 10/1999 |
| EP | 3066965 | A1 | 9/2016 |
| GB | 2072887 | A | 10/1981 |
| GB | 2501875 | A | 11/2013 |
| KR | 20-0338453 | | 1/2004 |
| KR | 10-0869071 | B | 11/2008 |
| WO | 2018/191372 | A1 | 10/2018 |

OTHER PUBLICATIONS

Great Britain Search Report from Application No. 1904199, mailed May 28, 2019, 8 pages.
Chinese First Office Action for Application No. 201910231675X dated Sep. 29, 2023, 8 pages.
Chinese Second Office Action for Application No. 201910231675.X dated Apr. 27, 2024, 21 pages with translation.
Great Britain Search Report from Application No. 1904200, mailed May 29, 2019, 8 pages.
Chinese Decision on Rejection for Application No. 201910226998X dated Sep. 27, 2024, 18 pages with English translation.
Canadian Office Action for Application No. 3037936 dated Sep. 24, 2025, 5 pages.
Canadian Office Action for Application No. 3037937 dated Sep. 24, 2025, 8 pages.

* cited by examiner

*600*

Creating A Vacuum Within An Evacuation Cavity Disposed Below A Grilling Cavity — *605*

Drawing Combustion Byproducts Down From The Grilling Cavity Into The Evacuation Cavity — *610*

Drawing Combustion Byproducts Out Of An Outlet Of The Evacuation Cavity — *615*

SELF-CLEANING GRILLING DEVICES

CROSS-REFERENCE TO RELATED APPLICATIONS

This application is a continuation of U.S. patent application Ser. No. 16/362,327, filed Mar. 22, 2019, now U.S. Pat. No. 11,350,791, issued Jun. 7, 2022, which claims priority to and the benefit of U.S. Provisional Application Ser. No. 62/648,216 entitled "Self-Cleaning Pellet Grill," filed on Mar. 26, 2018, the disclosure of each of which is hereby incorporated herein in its entirety by this reference.

TECHNICAL FIELD

The present disclosure relates generally to systems, methods, and devices for grilling and warming food products. In particular, embodiments of the present disclosure relate to self-cleaning solid-fuel grills.

BACKGROUND

Persons often use grilling devices for cooking and preparing food products. The grilling cavity of a solid fuel grill usually includes a firepot to hold fuel, such as wood pellets or other fuel, for combustion. Solid fuel grills also typically include a blower that circulates air into and through the firepot to facilitate combustion of the fuel. Fuel combustion produces byproducts, such as ash and smoke that rises out of the firepot and carries creosote and soot throughout the grill.

In addition, the circulating air carries combustion byproducts, which would otherwise remain in the firepot, out of the firepot and throughout the grill. Some of the ash and soot can enter the cooking chamber. Ash and soot that enter the cooking chamber come into contact with the food and negatively affects its taste and quality.

Also, over time, the ash, soot and creosote accumulate in the grilling cavity of the grill, including within the firepot. This accumulation negatively affects the performance of the grill in a number of ways. For example, excess combustion byproducts accumulating in the firepot decreases the efficiency of combustion. This decreases combustion efficiency and increases the amount of combustion byproducts produced and negatively affects the flavor of smoke entering the cooking chamber. Also, for example, accumulation of ash, soot, and creosote within other areas of the cooking chamber can negatively affect the flavor of the smoke or otherwise negatively affect the performance of the grill.

Therefore, those cooking with grilling devices such as solid fuel grills need to periodically clean out the grilling chamber and firepot to avoid the negative effects of combustion byproducts accumulating in the grill. Current grills do not provide easy or convenient ways to clean combustion byproducts out of the grill.

For example, to clean a typical solid fuel grill, a person typically must first remove various components of the grill to access the firepot and grill cavity. The removal of various grill components itself can be cumbersome and time consuming. Then, the person must remove the byproducts manually using brushes, scrapers, or other tools. Manually cleaning out the firepot and grill cavity of a grill is difficult, messy, and often not very effective.

For example, one may find it difficult to reach certain internal spaces within the grilling cavity to effectively remove all the unwanted combustion byproducts. In addition, one may not possess the required tools necessary to effectively clean the grill. Also, for example, the transfer of ash and soot from the grilling cavity into a trash bin or other container is hard to control. Manually cleaning or handling ash and soot inevitably results in contaminating other objects or surfaces surrounding the grill, such as walls, floors, tables, or other nearby objects.

Finally, after disassembling the grill and manually cleaning out the grilling cavity, one then must reassemble the grill. Reassembly may be complicated, require extensive time, and lead to errors. These errors may cause the grill to function improperly.

Due to the complicated nature of cleaning grills themselves, people often delay cleaning or do not clean them at all. This infrequency of cleaning exacerbates the problems associated with the accumulation of combustion byproducts within the grill. The longer a person waits to clean the grill, the harder it is to do so, because excessive accumulation becomes thick and hard.

Accordingly, there are a number of disadvantages in grilling devices and systems that can be addressed.

BRIEF SUMMARY OF THE INVENTION

Disclosed embodiments include grill configurations, in particular, solid fuel grill configurations, that perform various levels of self-cleaning functions. As solid fuel grills expend fuel, ash and various related debris can accumulate within the grill. The accumulation of this ash and debris can result in poor performance of the grill and in some cases dangerous fires. Embodiments disclosed herein provide novel solutions for reducing the effort required to clean a grill and to provide some level of self-cleaning functionality to a grill.

In at least one embodiment, a self-cleaning solid fuel grilling device comprises a grilling cavity and a firepot disposed within the grilling cavity. In addition, the grilling device includes an evacuation cavity disposed beneath the firepot. The evacuation cavity is in communication with the grilling cavity.

Additionally, in at least one embodiment, the grilling device comprises a floor disposed between a grilling cavity and an evacuation cavity. The floor comprises one or more passageways extending through a thickness thereof and the grilling cavity and evacuation cavity are in communication through the passageways.

Further, in at least one embodiment, a self-cleaning solid fuel grilling device comprises a grilling cavity having a firepot disposed therein. In addition, the grilling device also includes an evacuation cavity disposed below the grilling cavity. In such an embodiment, the grilling device also includes a funnel disposed between the grilling cavity and the evacuation cavity. Combustion byproducts can travel through the funnel from the grilling cavity to the evacuation cavity.

In one embodiment, a method of cleaning a grilling device includes a first step of creating a vacuum within an evacuation cavity, which is disposed beneath a grilling cavity. A second step of such a method includes drawing combustion byproducts down from the grilling cavity into the evacuation cavity. A third step includes drawing combustion byproducts out of an outlet of the evacuation cavity.

In another embodiment of a method of cleaning a grilling device, a step may include preventing combustion byproducts from entering a cooking chamber of the grilling device. The combustion byproducts may be prevented from entering the cooking chamber by filtering air travelling from the grilling cavity to the cooking chamber. In such an embodiment, smoke can travel through the screen and into the cooking chamber, but combustion byproducts are blocked from entering the cooking chamber.

Additional features and advantages of exemplary implementations of the present disclosure will be set forth in the description, which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the present disclosure briefly described above will be rendered by reference to specific embodiments thereof, which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION

The present disclosure relates generally to systems, methods, and devices for grilling and warming food products. In particular, embodiments of the present disclosure relate to self-cleaning solid-fuel grills. In at least one embodiment, a self-cleaning solid fuel grilling device comprises a grilling cavity and a firepot disposed within the grilling cavity. In addition, the grilling device includes an evacuation cavity disposed beneath the firepot. The evacuation cavity is in communication with the grilling cavity.

The self-cleaning grill of the present disclosure includes features that automatically and effectively remove ash and soot from the grilling cavity, thus avoiding unwanted build-up in the grilling cavity and firepot. Users do not need to remove various components of the grill and manually clean out the ash and soot build-up within the grilling cavity of the grill. Instead, users can simply connect a vacuum nozzle, such as the nozzle of a home shop-vacuum, to an outlet of the grill and draw the ash and soot out. The self-cleaning solid fuel grill of the present disclosure reduces ash and soot accumulation in the firepot and grilling cavity, resulting in more efficient and effective fuel combustion. Users can clean out the ash and soot frequently, effectively, and without mess.

In general, as recited herein, the terms "byproducts" or "combustion byproducts" refer to ash, soot, and creosote, as well as any other byproduct resulting from the combustion of fuel, such as wood pellets, within a grilling device.

The combustion of wood pellets produces smoke, which generates a number of combustion byproducts, such as soot, ash, and creosote. Using the definitions provided in the 2019 NFPA Glossary of Terms: the term "ash," as used herein, means solid residue that remains after combustion is complete; and "soot," as used herein, means particles of carbon produced in a flame. Soot is the byproduct of incomplete combustion. One will appreciate that depending upon the characteristics of a combustion within a firepot, it may be necessary to remove both ash and soot during a cleaning process.

Creosote is an oily compound comprising hundreds of chemicals, including guaiacol, syringol, and phenols, which are the largest contributors to smoke flavor. Creosote can contribute positively to the flavor and color of smoked foods and acts as a preservative.

Figure 1:
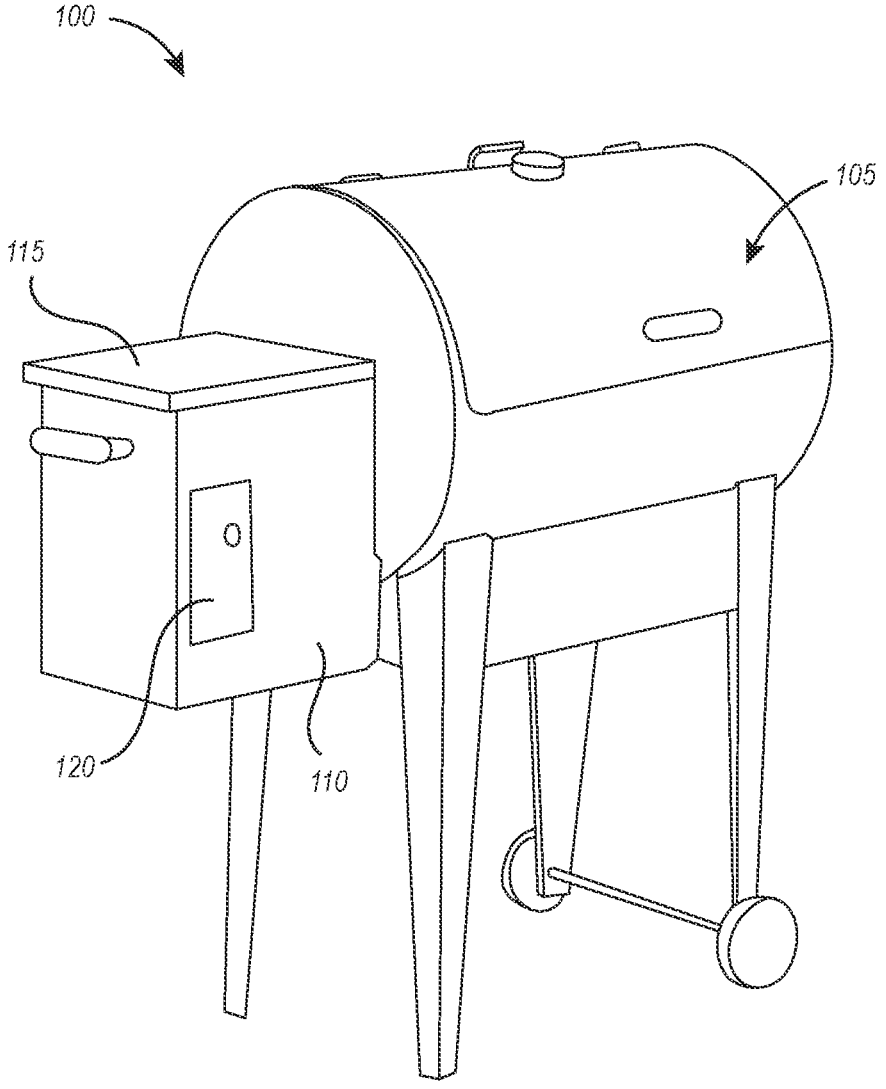
FIG. 1 illustrates a perspective view of a grilling device according to an embodiment of the present disclosure.

Turning now to the figures, FIG. 1 is an illustration of an embodiment of a self-cleaning grilling device 100. In such an embodiment, the grilling device 100 includes an upper cooking chamber 105 in which a user prepares food. The grilling device 100 may be a solid fuel grill that includes a lower portion 110 that houses an auger feeder system and a firepot. The lower portion 110 of the grilling device 100 can also include various other components, such as a blower and heating element. These and other components housed within the lower portion 110 are shown and described in more detail below with reference to FIGS. 2 and 3.

Referring still to FIG. 1, the illustrated embodiment of the grilling device 100 also includes a hopper 115 and a user control interface 120. A user can open the top portion of the hopper 115 and introduce fuel, such as wood pellets, into the auger feeder system of the lower portion 110 of the grilling device 100 through the hopper 115. A user can adjust a control knob, or various other control interface buttons, to adjust a temperature of the cooking chamber 105 of the grilling device 100.

One will appreciate that the embodiment of the grilling device 100 shown in FIG. 1 is just one example of a solid fuel grill according to the present disclosure. One or more other embodiments of a grilling device 100 may comprise other components or configurations. In addition, at least one embodiment of a grilling device 100 includes similar components rearranged in different locations relative to one another without affecting the basic functionality of the grilling device 100. For example, at least one embodiment of a grilling device 100 includes a hopper 115 on the right side of the grilling device 100, on the front side of the grilling device 100, or a user control interface 120 located elsewhere on the grilling device 100.

Figure 2:
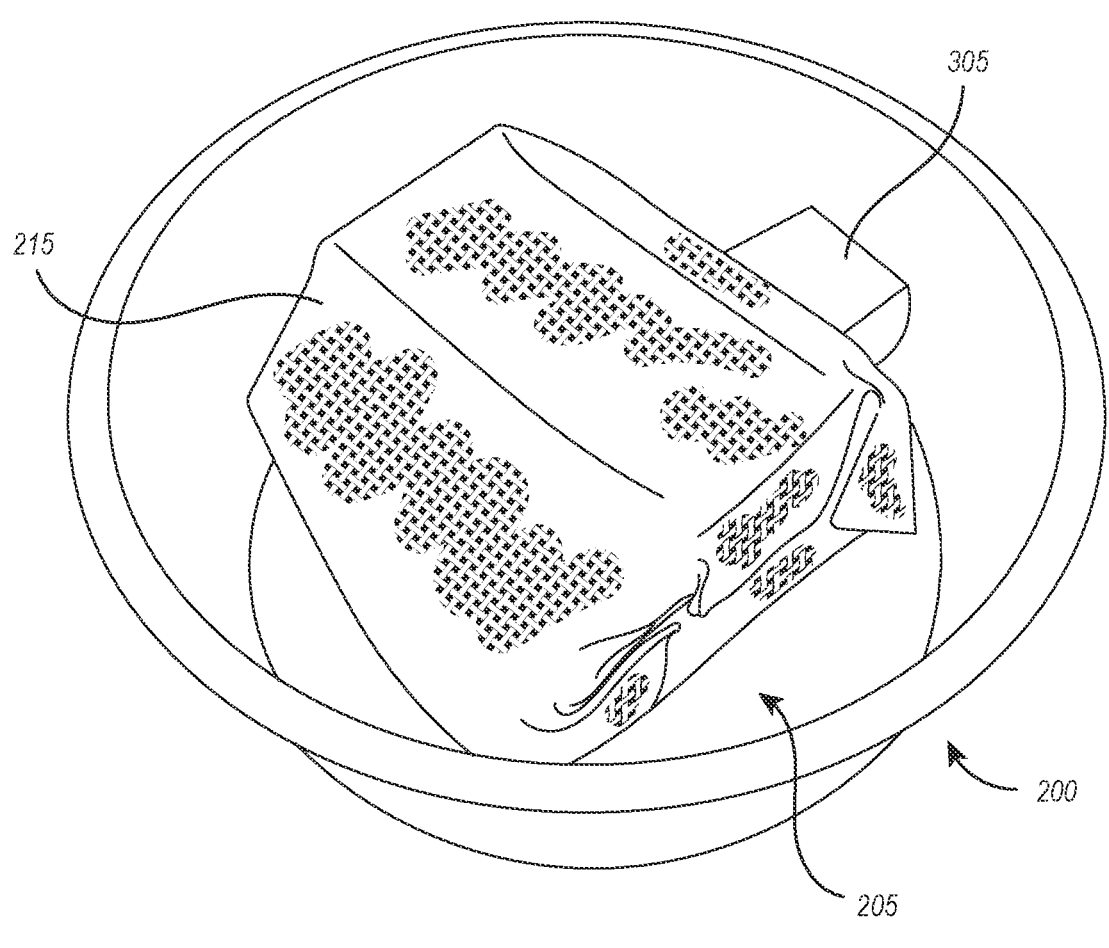
FIG. 2 illustrates a perspective view of a grilling cavity according to an embodiment of the present disclosure.
Figure 3A:
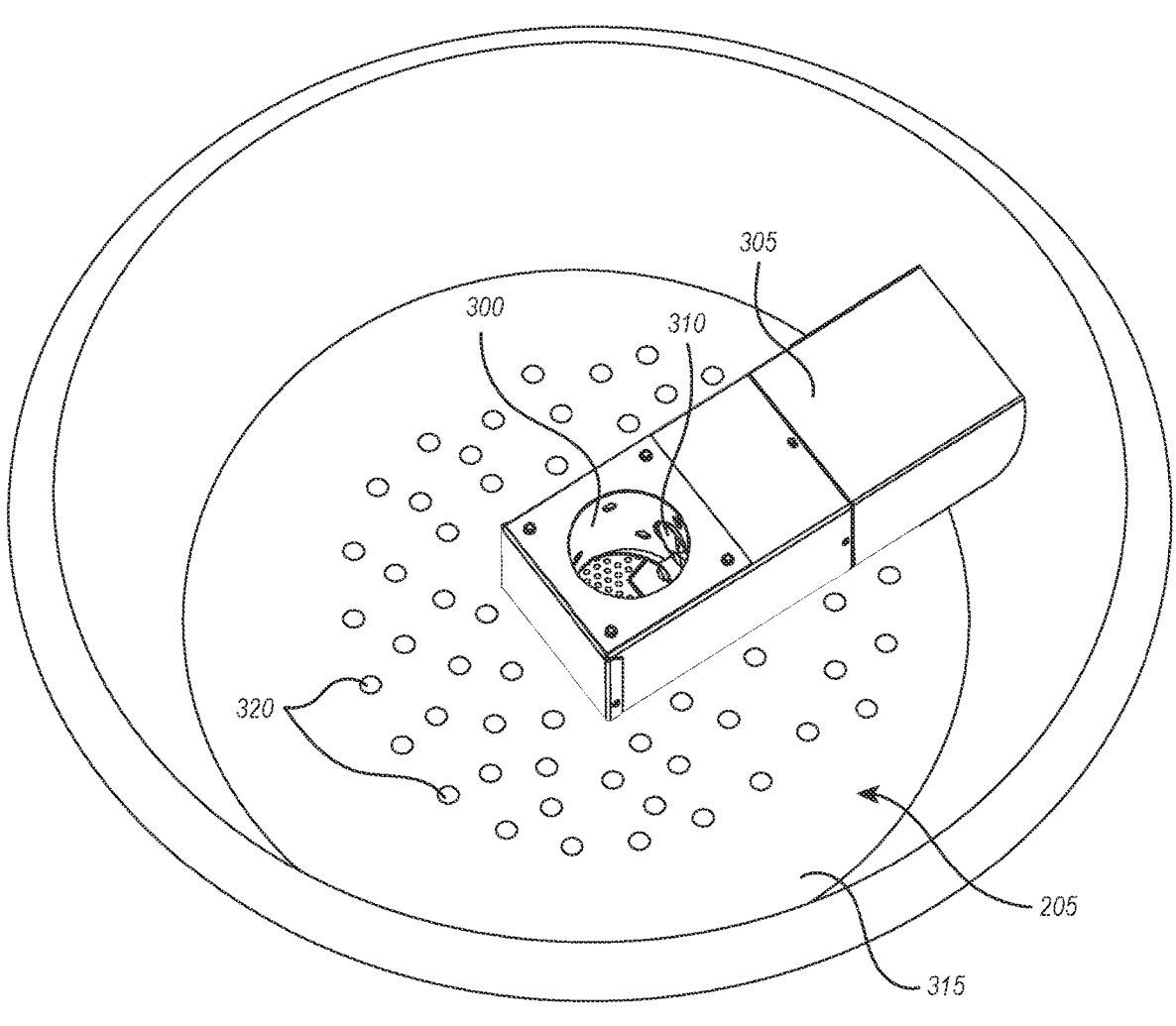
FIG. 3A illustrates a perspective view of a firepot and auger box inside a grilling cavity according to an embodiment of the present disclosure.
Figure 7A:
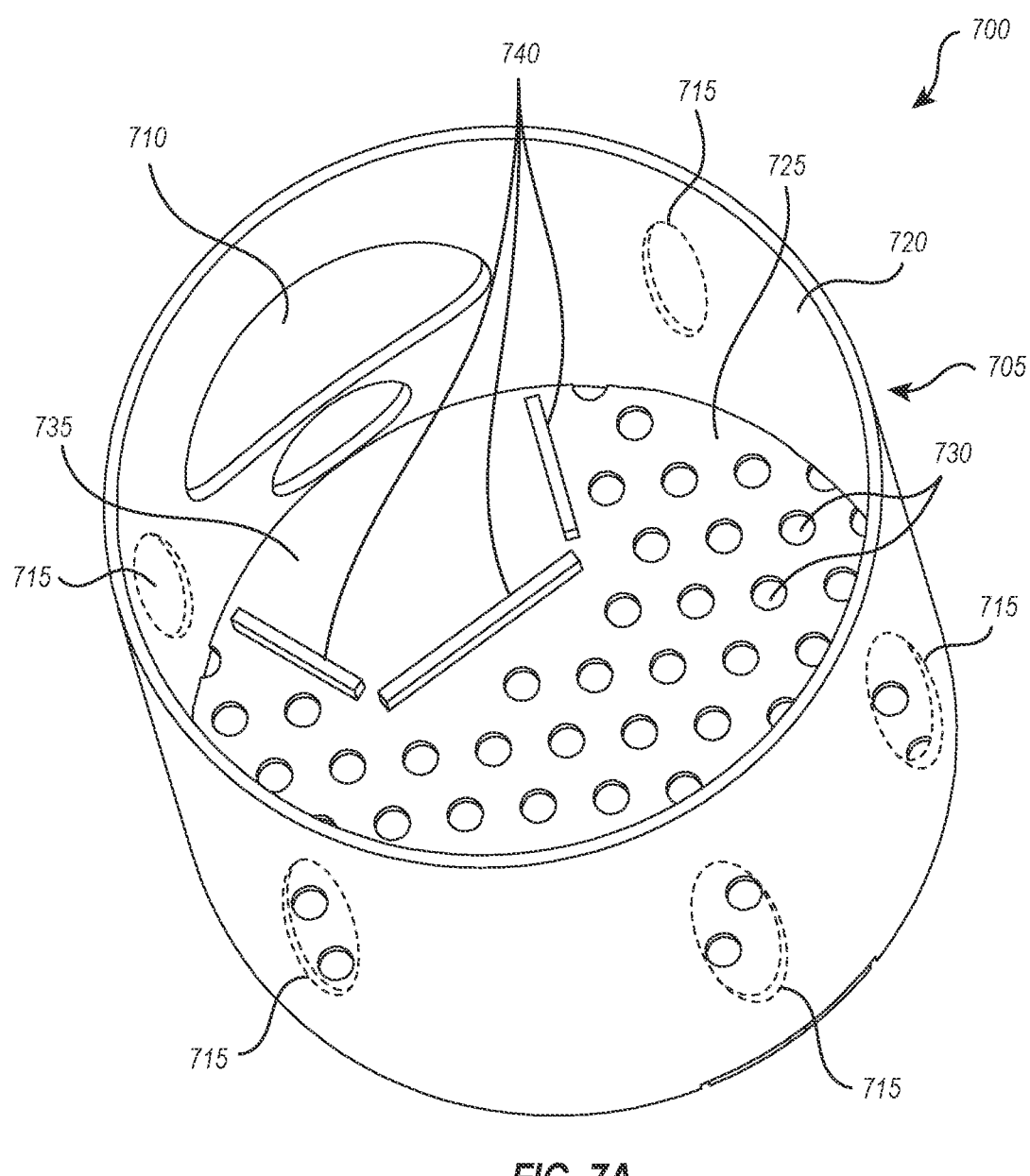
FIG. 7A illustrates a perspective view of a firepot according to an embodiment of the present disclosure.
Figure 7B:
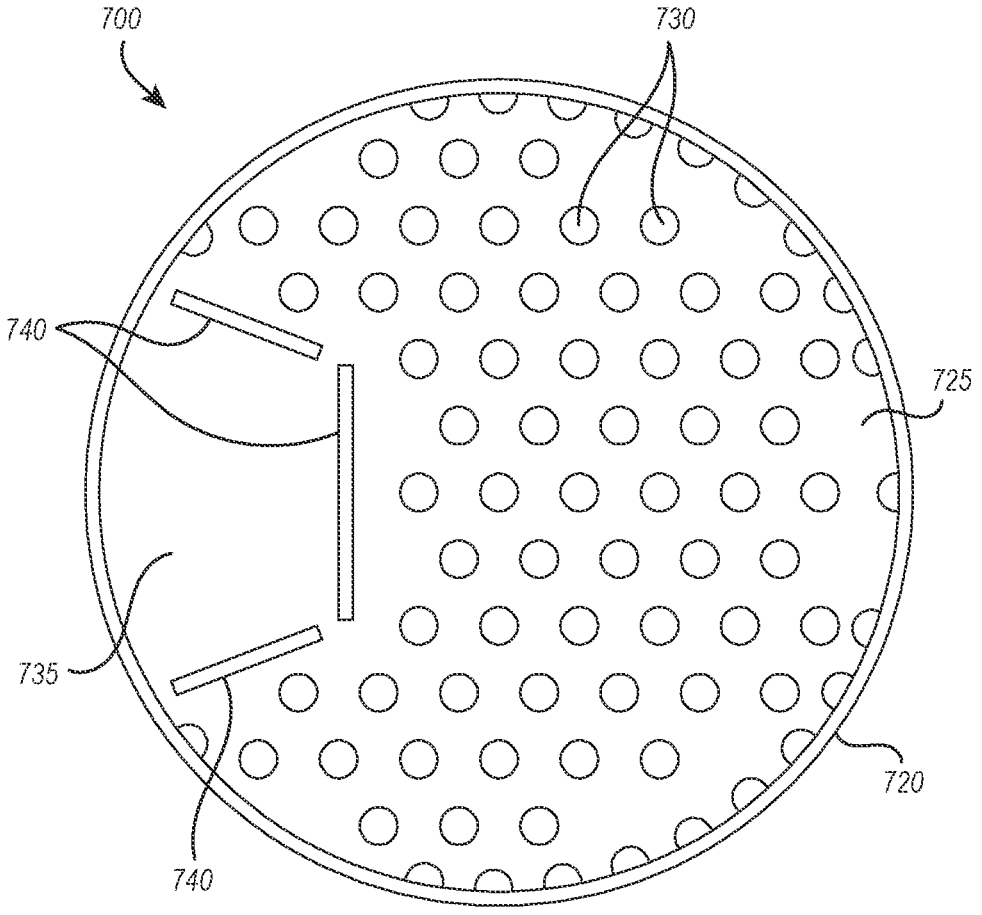
FIG. 7B illustrates a top view of the firepot illustrated in FIG. 7A.

FIG. 2 illustrates an embodiment of a grilling device 200 with the upper portion and cooking chamber removed to illustrate the grilling cavity 205. In particular, FIG. 2 shows an auger box 305 extending into the grilling cavity 205. FIG. 2 also shows a screen 215 at least partially surrounding various components of the grilling cavity 205, such as a firepot and at least a portion of the auger box 305. FIG. 2 does not show the firepot but FIGS. 3A, 7A, and 7B illustrate a firepot, which is described in more detail below. The auger box 305 encompasses an auger feeder system and can act as a conduit for feeding fuel into the firepot.

The screen 215 surrounding the firepot, referred to generally herein as a screen, filters combustion byproducts out of the air and smoke emanating from the firepot underneath the screen 215. Smoke and heat still pass through the screen 215 but the unwanted byproducts cannot enter the cooking chamber above the grilling cavity 205 due to the screen.

Thus, one will appreciate that the term "screen" generally refers to any type of material or mechanism that filters the byproducts out of the rising air and smoke emanating from beneath the screen and entering the cooking chamber above. For example, in at least one embodiment, the screen 215 comprises a metal mesh material, such as a stainless-steel mesh. In at least one embodiment, the screen 215 comprises a woven fabric suitable for use in filtering high-temperature smoke and air. In one or more other embodiments, the screen 215 may comprise a porous material having pores large enough to allow air and smoke to pass through but small enough to block unwanted combustion byproducts from entering the cooking chamber above the screen 215.

As used herein the "screen" 215 equally refers to any type of filter components. For example, the screen may comprise an ionic filter, a water-based filter, or a centrifugal filter. Furthermore, in at least one embodiment, the screen 215 comprises a combination of any two or more of the various types of filters noted above.

FIG. 3A shows the grilling cavity 205 of FIG. 2 without the screen 215 so that the firepot 300 disposed beneath the screen 215 is visible. In particular, FIG. 3A shows an auger box 305 extending into the grilling cavity 205. The auger box 305 houses an auger feeder system that feeds fuel into the firepot 300 through an opening 310 in the side of the firepot 300. The fuel can comprise pellets, such as wood pellets, or other suitable fuel that can be fed into the firepot 300 through the auger box 305.

FIG. 3A further illustrates a floor 315 defining the bottom of the grilling cavity 205. The auger box 305 and firepot 300 are disposed above the floor 315. In one embodiment, the auger box 305 and/or firepot 300 may be disposed above the floor 315 so that the auger box 305 and firepot 300 are spaced apart from the floor 315. In at least one embodiment, the auger box 305 and/or firepot 300 contact the floor 315 or rest directly on the floor 315.

The floor 315 also includes a number of passageways 320 extending therethrough. The number, size, and position of each passageway may differ in one or more other embodiments. In the illustrated embodiment of FIG. 3A, the passageways 320 are generally positioned underneath where the screen 215 covers the grilling cavity 205 and firepot 300. Also, while the illustrated passageways 320 are circular, so as to form circular openings in the floor 315, one or more other embodiments of the floor 315 may include passageways of other shapes so that the openings are not necessarily circular.

For example, in at least one embodiment, each of the passageways 320 form oval, rectangular, square, polygonal, or irregularly shaped openings in the floor 315. In addition, as noted above, the size of each passageway 320 opening may vary within the same embodiments of the floor 315 or from one embodiment to the other. Also, as noted above, the total number and position of each passageway may vary in one or more other embodiments.

For example, in at least one embodiment, the passageways 320 extend across the whole floor 315 to the outer perimeter thereof. In at least one embodiment, the passageways 320 extend across the floor to a lesser degree than that shown in FIG. 3A. It is preferable that the passageways 320 at least be disposed beneath the screen 215 when the screen extends over the firepot 300 and above the floor 315, as shown in FIG. 2.

Additionally, at least one embodiment of the grilling cavity 205 comprises an additional layer disposed above the passageways 320 on the floor 315. Such an additional layer may comprise, for example, a grate or mesh screen extending over the passageways 320 and on the floor 315 below the firepot 300 and/or auger box 305.

Figure 3B:
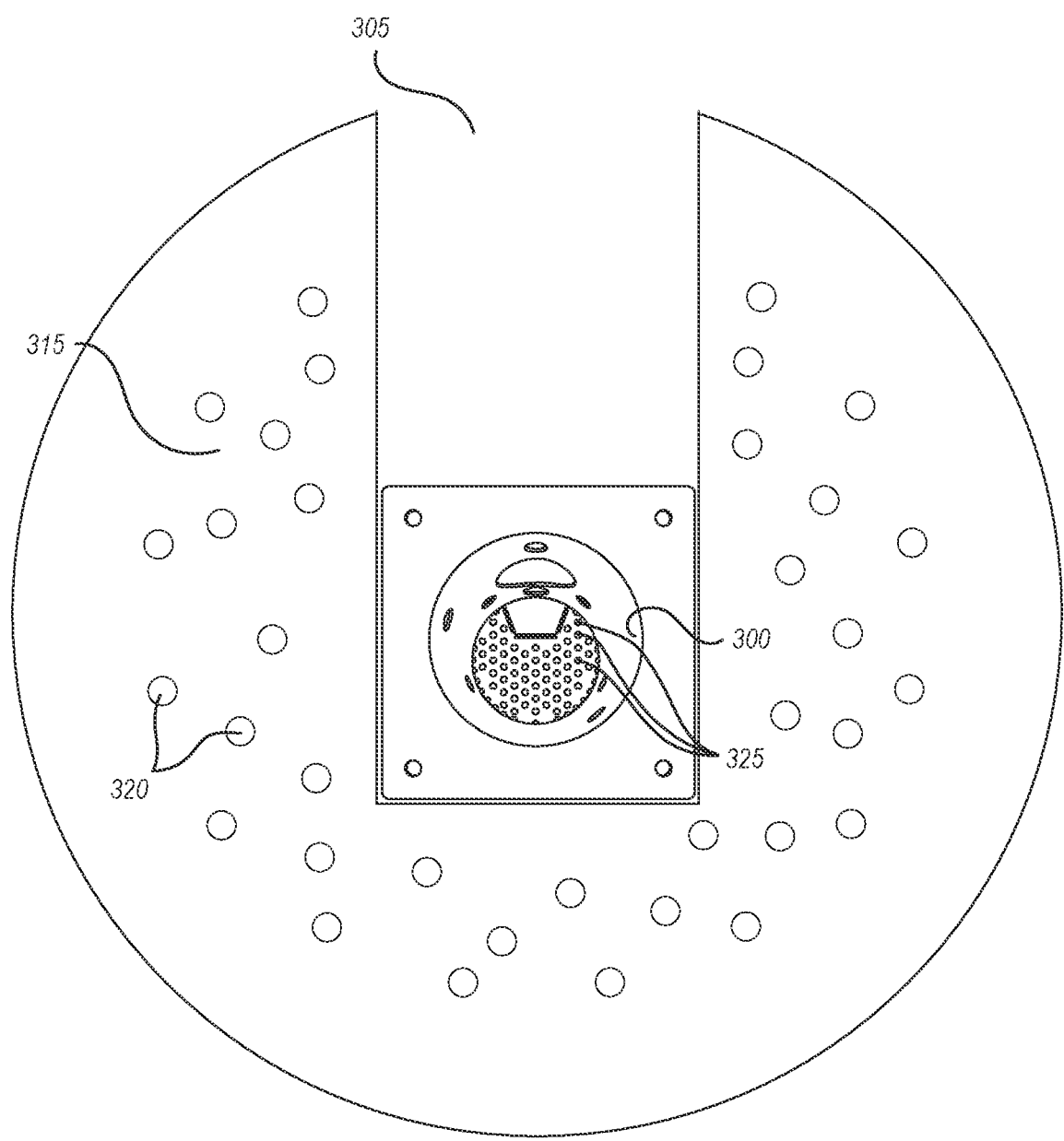
FIG. 3B illustrates a top view of a portion of the grilling cavity illustrated in FIG. 3A according to an embodiment of the present disclosure.

FIG. 3B illustrates a top view of the auger box 305, firepot 300, and floor 315 illustrated in FIG. 3A. In at least one embodiment, the firepot 300 includes a plurality of ventilation holes 325 in extending through bottom thereof. The ventilation holes 325 in the firepot 300 are separate from the passageways 320 in the floor 315 of the grilling cavity 205.

In the illustrated embodiment of FIG. 3B, the firepot 300 includes an open container having a circular opening at the top thereof. The various embodiments of the firepot 300 illustrated in the Figures and described herein are substantially cylindrical and have a circular cross-sectional shape. However, in one or more other embodiments, the firepot 300 may include various other cross-sectional shapes. For example, one embodiment of a firepot 300 may include an open container with a square or rectangular cross-sectional shape. At least one embodiment includes various other cross-sectional shapes, such as oval, triangular, or other polygonal or irregular shapes. Still other embodiments include a semi-spherical open container, rather than a cylindrical or other prism configuration.

In addition, one or more other embodiments of the firepot 300 may include a larger or smaller number of ventilation holes 325 than those shown in the embodiment illustrated in FIG. 3B. In at least one embodiment, the diameter of the ventilation holes 325 varies or are the same size. One or more other embodiments may also include different patterns and arrangements of the position of the ventilation holes 325 in the firepot 300. The ventilation holes 325 are configured to allow unwanted byproducts of fuel combustion within the firepot 300 to fall through the bottom of the firepot 300 and onto the floor 315 of the grilling cavity 205. Thus, the ventilation holes 325 in the firepot 300 reduce the accumulation of byproducts within the firepot 300.

Figure 4A:
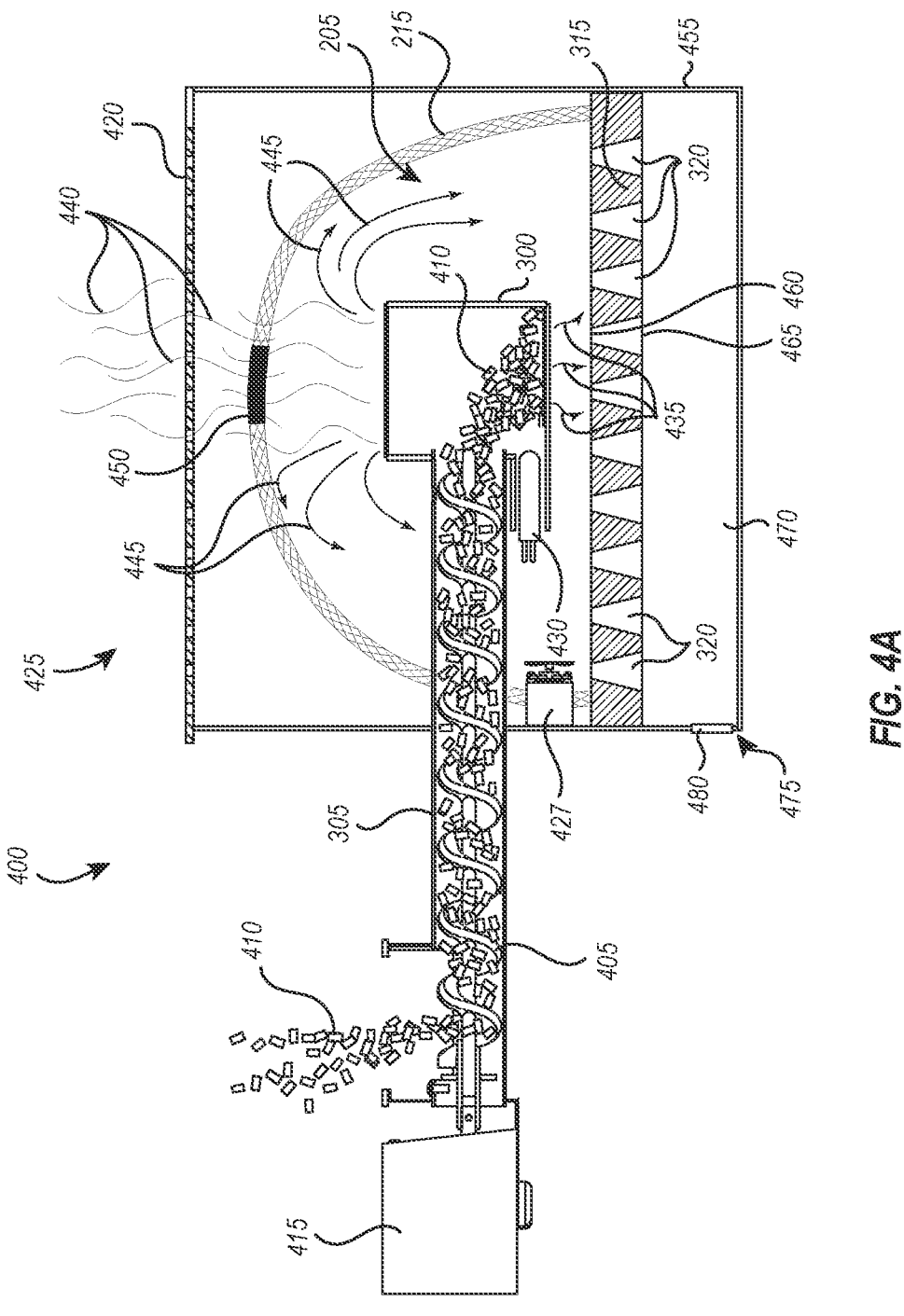
FIG. 4A illustrates a self-cleaning solid fuel grill according to an embodiment of the present disclosure.

FIG. 4A illustrates a cross-sectional view of another embodiment of a self-cleaning grilling device 400. The illustrated embodiment includes an auger box 305 that houses an auger feeder system 405 driven by a motor 415. The auger feeder system 405 carries fuel 410 from the hopper 115 (shown in FIG. 1) to the firepot 300 for combustion. The firepot 300 extends into the grilling cavity, where a screen 215 at least partially surrounds the firepot 300 and/or grilling cavity 205. The screen 215 extends over the firepot 300 and beneath a cooking surface 420 of the grilling device 400. The cooking surface 420 at least partially defines the bottom of a cooking chamber 425, which is disposed above the grilling cavity 205.

In the illustrated embodiment, a heating element 430 ignites the fuel 410 residing within the firepot 300. The fuel 410 combusts within the firepot 300 and produces heat and smoke 440, and unwanted byproducts such as ash and soot.

At least one embodiment also includes a blower 427 in communication with the grilling cavity 205 of the grilling device 400. The blower 427 circulates air throughout the grilling cavity 205 and over and/or around the heating element 430 and firepot 300. The circulating air flows over the heating element 430 and enters the interior space of the firepot 300 after passing over the heating element 430. In this way, the blower 427 may aid in the ignition of the fuel 410 inside the firepot 300 through convective heat transfer from the heating element 430. The circulating air from the blower 427 may also increase combustion of fuel 410 in the firepot 300 by providing oxygen to the interior space of the firepot 300.

As noted above, combustion byproducts may tend to accumulate within the firepot 300 over time. These byproducts can fall through the ventilation holes 325 extending through the bottom of the firepot 300, as indicated by arrows 435, and onto the floor 315 of the grilling cavity 205. In addition, combustion byproducts may naturally rise out of the firepot 300 with the heated air and smoke 440. In addition, the circulating air from a blower 427 may increase the amount of byproduct that exits the firepot 300 through the ventilation holes 325 or top opening of the firepot 300.

Hot air and smoke 440 produced by the combusting fuel 410 travels through the screen 215, which at least partially surround the grilling cavity 205 over the firepot 300. The heat and smoke enter the cooking chamber 425 through the cooking surface 420 to heat and cook food. However, as noted above, the screen 215 prevents the unwanted byproducts of combustion from entering the cooking chamber 425 with the smoke 440. For example, the screen 215 may block ash and soot from entering the cooking chamber 425. Instead, as indicated by the arrows 435, the combustion byproducts exiting the firepot 300 fall to the floor 315 of the grilling cavity 205. While creosote, which can give food its delicious smoked flavor, may pass through the screen to the cooking chamber 420, some creosote emanating from the firepot 300 may also accumulate on the floor 315 of the grilling cavity 205.

In at least one embodiment, the grilling cavity 205 also includes a heat shield 450 configured to disperse heat emanating from the firepot 300. The heat shield 450 prevents uneven hot-spots transferring from the firepot 300 to the cooking surface 420. In at least one embodiment, the heat shield 450 is integrally formed with the screen 215 and reside above the firepot 300. In one or more other embodiments, the heat shield 450 may be formed separately and reside above, below, or within the thickness of the screen 215.

In addition, in at least one embodiment, the heat shield 450 comprises an insulating material that is flame resistant. Such an insulating material may prevent heat transferring from directly above the firepot 300 to the cooking surface 420. In this way, the heat shield forces heat from the firepot 300 to disperse around the heat shield 450 to all areas of the cooking surface 420. The heat shield thus promotes even temperatures across the cooking surface 420.

FIG. 4A also shows the passageways 320 extending through a thickness of the floor 315 of the grilling cavity 205. An evacuation cavity 455, disposed below the grilling cavity 205, is in communication with the grilling cavity 205 through the passageways 320. In one embodiment, each passageway 320 includes a first opening 460 at the top side of the floor 315 and a second opening 465 at the bottom side of the floor 315. In at least one embodiment, the first opening 460 is smaller than the second opening 465 so that each of passageways 320 is funnel-shaped. In particular, in the illustrated embodiment of FIG. 4A, each of the passageways 320 is a reverse funnel shape.

In this way, the passageways 320 provide a path for combustion byproducts to pass from the grilling cavity 205 to the evacuation cavity 455. In at least one embodiment, the passageways 320 are substantially conical funnels. In one or more other embodiments, the passageways 320 may comprise other shapes. For example, at least one embodiment includes cylindrical passageways 320. In at least one other embodiment, the passageways 320 have square, rectangular, triangular, or other cross-sectional shapes. In addition, as noted above with reference to the passageways 320 shown in FIG. 3A, the number and spacing of the passageways 320 can vary in one or more other embodiments.

FIG. 4A further illustrates a chamber 470 within the evacuation cavity 455 into which combustion byproducts from the grilling cavity 205 may fall via the passageways 320. The chamber 470 is an internal space within the evacuation cavity 455 in which the byproducts can collect. In at least one embodiment, the evacuation cavity 455 also includes an outlet 475 through which the byproducts can escape. In the illustrated embodiment, a cap 480 is removably placed over the outlet 475 to block byproducts from escaping the evacuation cavity 455.

In addition, in at least one embodiment, the outlet 475 of the chamber 470 is configured to communicate with a vacuum nozzle, such as the end of a shop-vacuum or other vacuum cleaner. A user can connect such a vacuum nozzle to the outlet 475 of the chamber 470 to draw byproducts out from the chamber 470.

The features illustrate in FIG. 4A and described above, including the screen 215, passageways 320, evacuation cavity 455, chamber 470, and outlet 475, can be implemented as self-cleaning features. For example, as noted above, FIG. 4A shows smoke 440 and combustion byproducts 445 emanating from the firepot 300 due to fuel combustion therein. In at least one embodiment, a blower 427 may also circulate air within the grilling cavity 205 and into the firepot 300 to facilitate combustion of the fuel 410 inside the firepot 300.

However, the circulation of air can also carry combustion byproducts 445 out of the firepot 300. In at least one embodiment, the smoke 440 rises and escapes through the screen 215 but the byproducts 445 do not. In such an embodiment, the byproducts 445 settle and accumulate on the floor 315 of the grilling cavity 205.

Figure 4B:
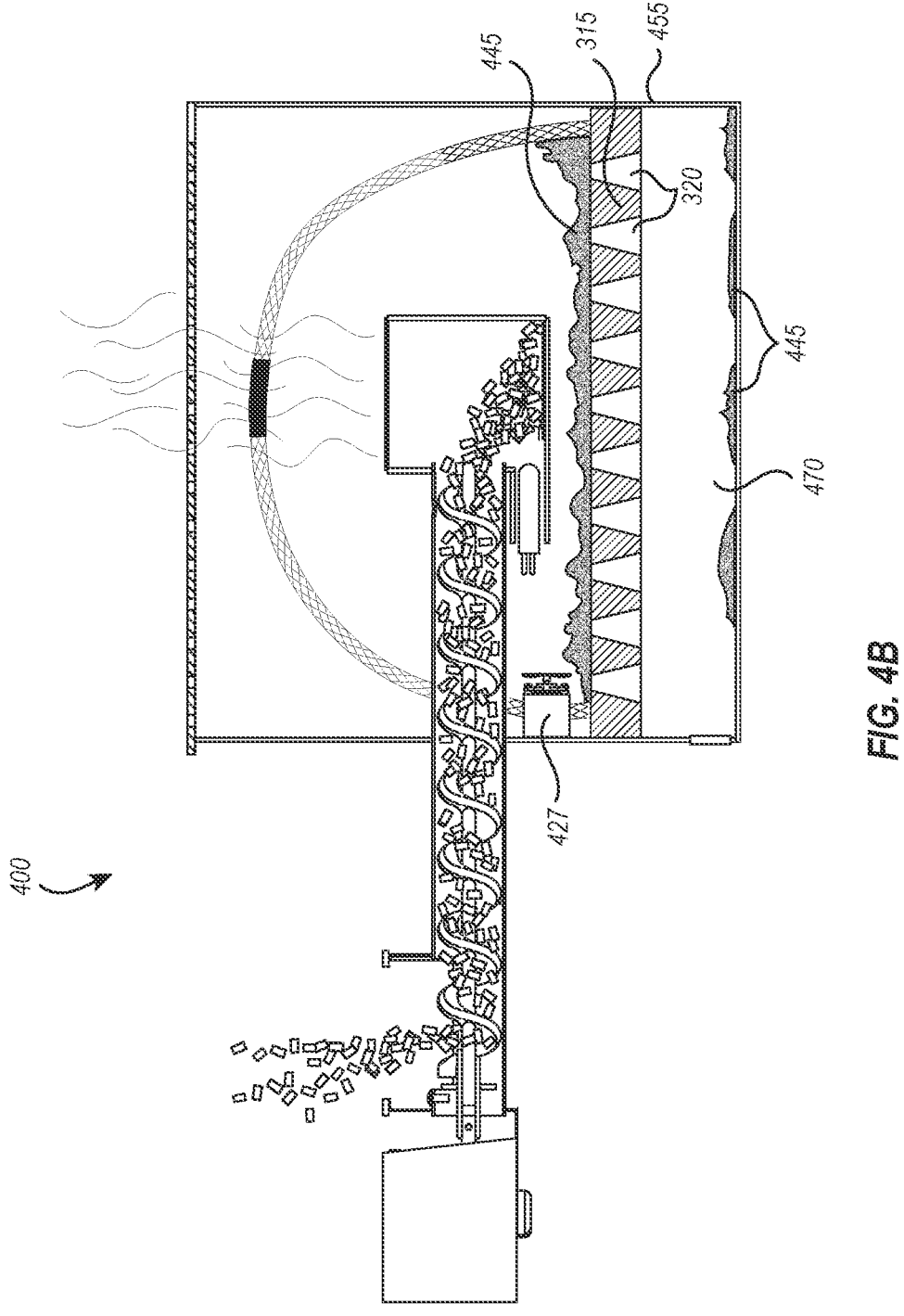
FIG. 4B illustrates a self-cleaning solid fuel grill with combustion byproducts accumulated in the grilling cavity according to an embodiment of the present disclosure.
Figure 4C:
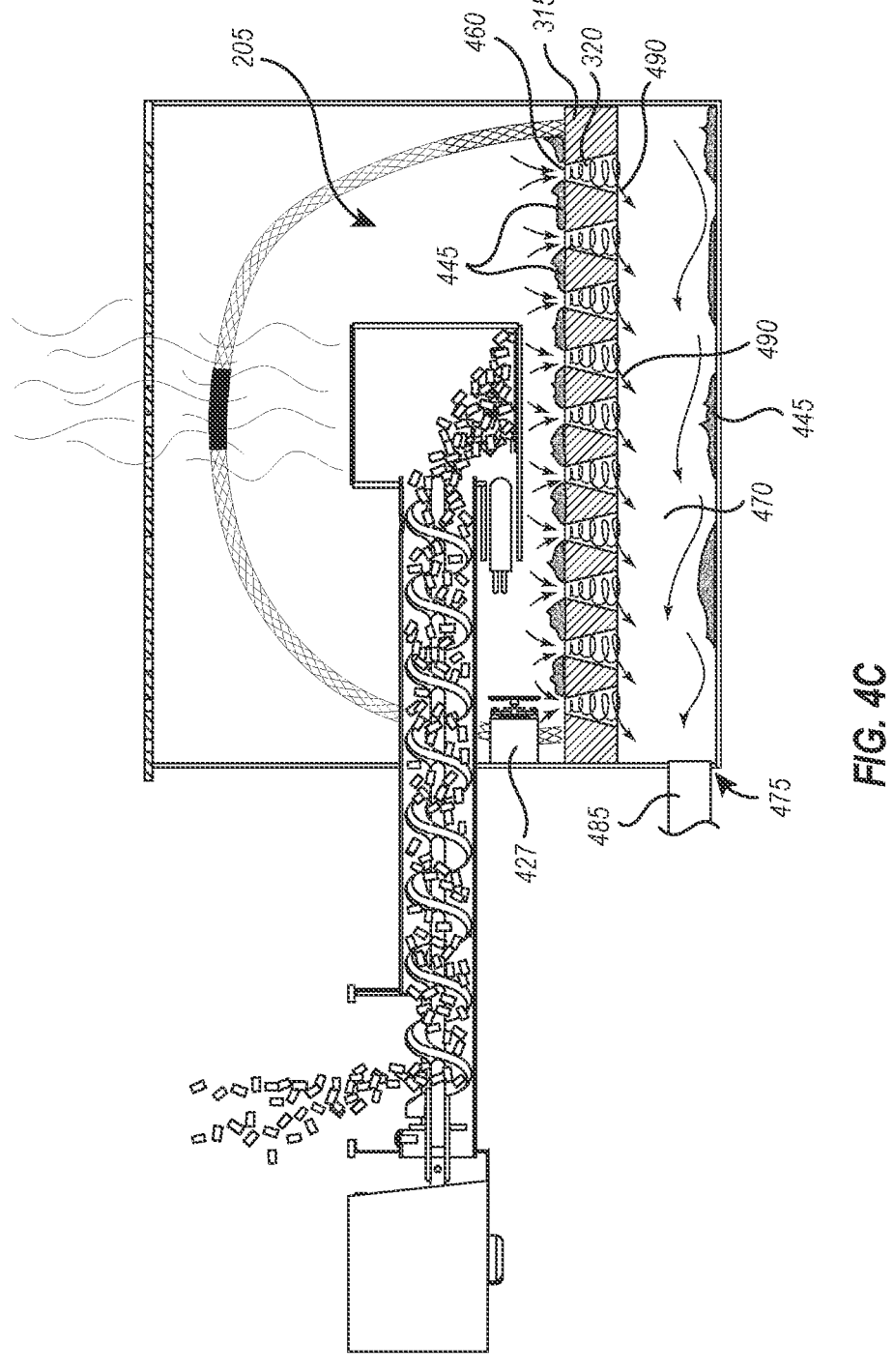
FIG. 4C illustrates a self-cleaning solid fuel grill with a vacuum connected to the evacuation cavity according to an embodiment of the present disclosure.

Along these lines, FIG. 4B shows the accumulation of byproducts 445 on the floor 315 of the grilling cavity 205. FIG. 4C shows the byproducts 445 exiting the grilling cavity 205 through the holes 325 and down the passageways 320. Also, in at least one embodiment, the accumulated byproducts 445 on the floor 315 of the grilling cavity 205 passively fall through the passageways 320 into the chamber 470 of the evacuation cavity 455 simply due to gravity. In at least one embodiment, the passageways 320 are large enough to allow all or most of the byproducts 445 to passively fall through the floor 315 and into the chamber 470 of the evacuation cavity 455.

Additionally, in at least one embodiment of the self-cleaning grilling device 400, as shown in FIG. 4C, a user can connect a vacuum nozzle 485 to the outlet 475 of the chamber 470 of the evacuation cavity 455. The vacuum nozzle 485 creates a vacuum within the chamber 470, which draws byproducts from inside the evacuation cavity 455 out the outlet 475. In addition, the vacuum created in the chamber 470 of the evacuation cavity 455 draws byproducts 445 from the grilling cavity 205 through the passageways 320 and into the chamber 470.

The funnel shape of the passageways 320 causes the byproducts 445 traveling through the passageways 320 to circulate through the passageways 320 in a cyclonic manner. The arrows shown in FIG. 4C indicate the direction of travel of the byproducts 445 from the grilling cavity 205, through the passageways 320 into the chamber 470, and out the outlet 475 into the vacuum nozzle 485. In particular, the spiral arrows 490 through the passageways 320 indicate the cyclonic path the byproducts 445 take through the passageways 320 from the grilling cavity 205 to the evacuation cavity 455.

The funnel shape of the passageways 320 amplifies the suction force at the openings 460 at the top surface of the floor 315. This amplified suction force may effectively draw byproducts 445 down through the passageways 320 that would otherwise remain in the grilling cavity 205 on the floor 315 between passageways 320.

Once a user has drawn byproducts 445 out of the grilling cavity 205 and chamber 470 of the evacuation cavity 455, the user can replace the cap 480 over the outlet 475. The cap 480 may remain over the outlet 475 when the user is not cleaning byproducts 445 out of the chamber 470 via the vacuum nozzle 485. The cap 480 prevents insects, spiders, or other unwanted animals and/or debris from entering the chamber 470 of the evacuation cavity 455 when the user is not sucking out the byproducts 445 with the vacuum nozzle 485.

Figure 5A:
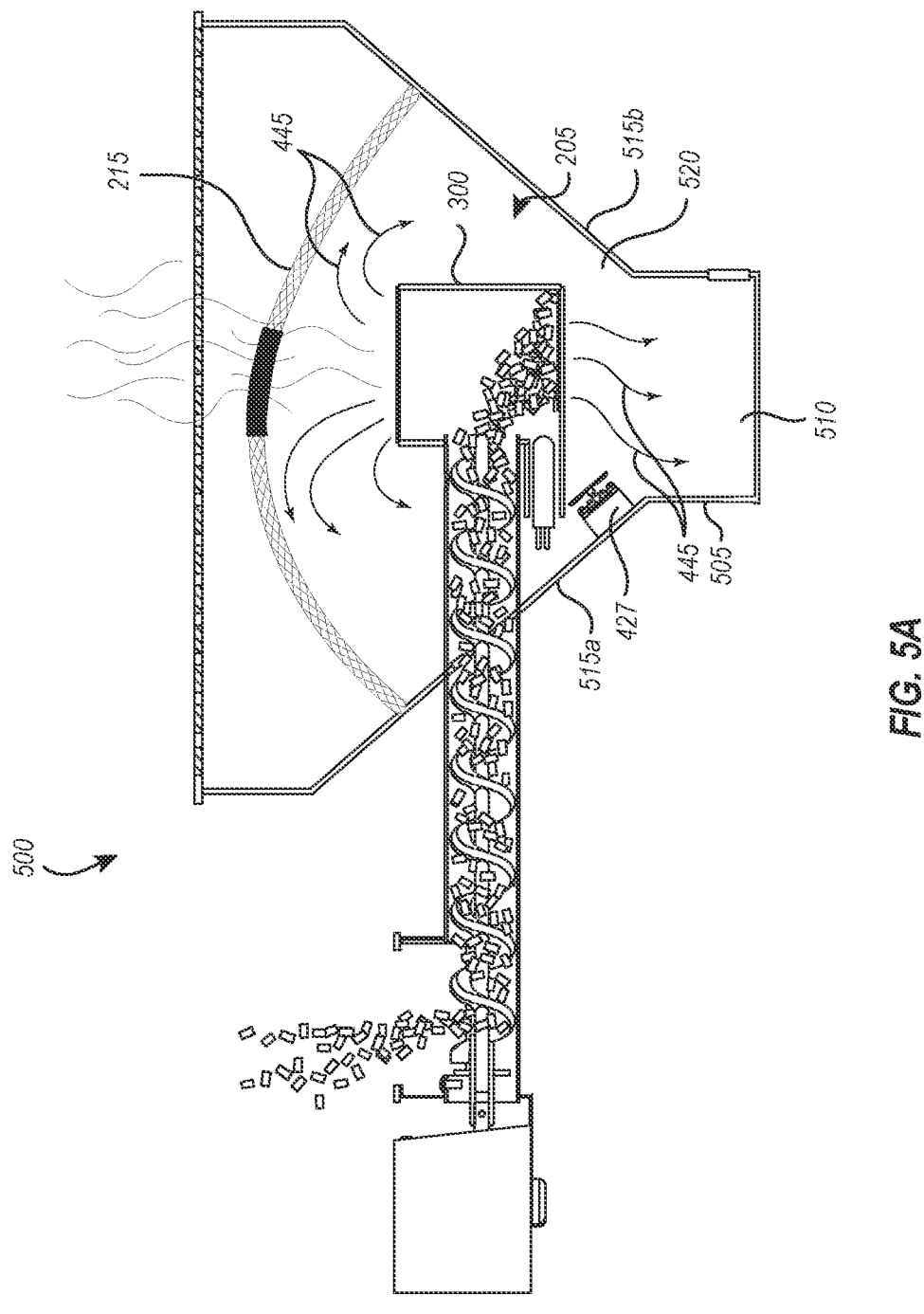
FIG. 5A illustrates a self-cleaning solid fuel grill according to an embodiment of the present disclosure.
Figure 5B:
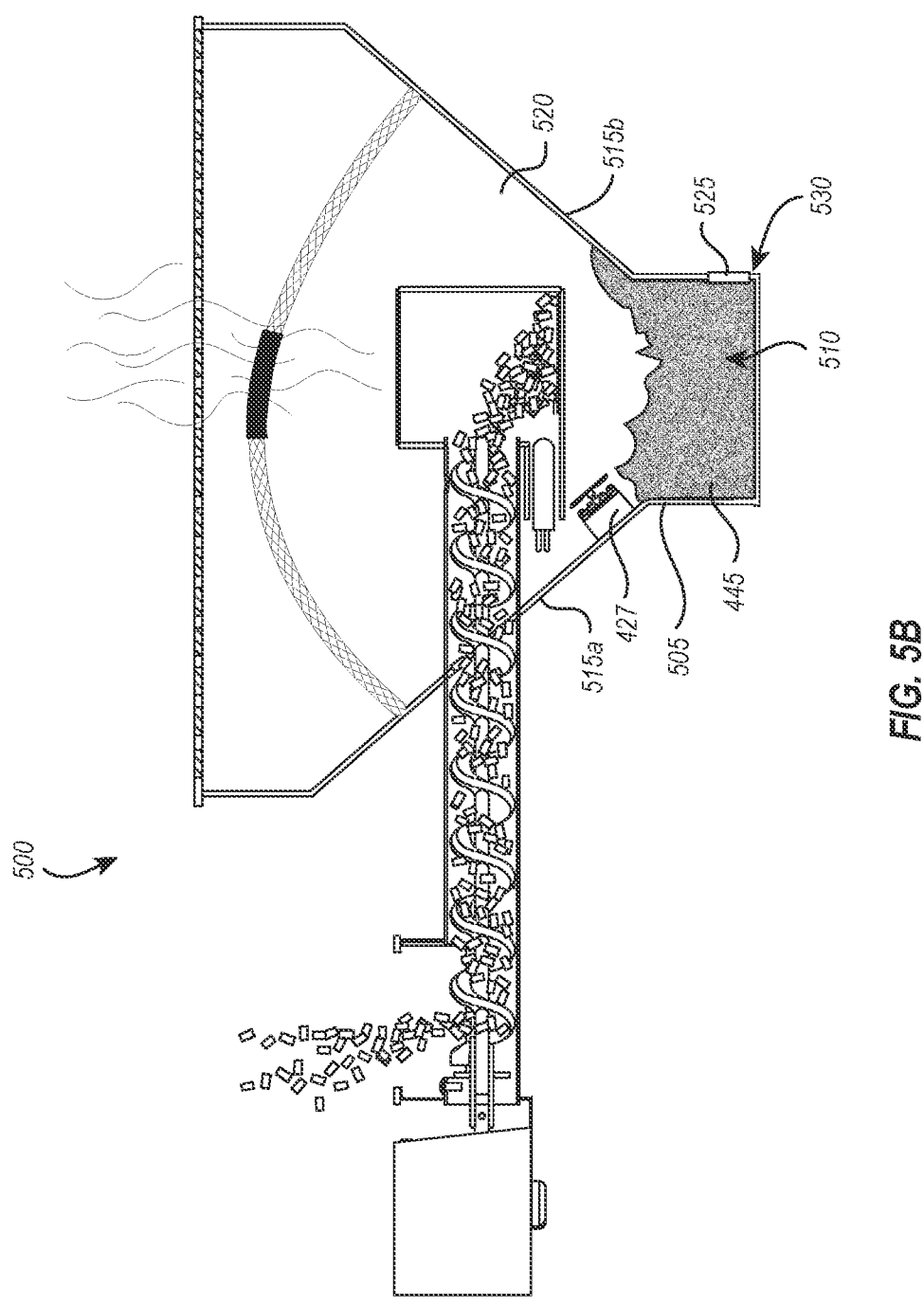
FIG. 5B illustrates a self-cleaning solid fuel grill with combustion byproducts accumulated in the grilling cavity according to an embodiment of the present disclosure.
Figure 5C:
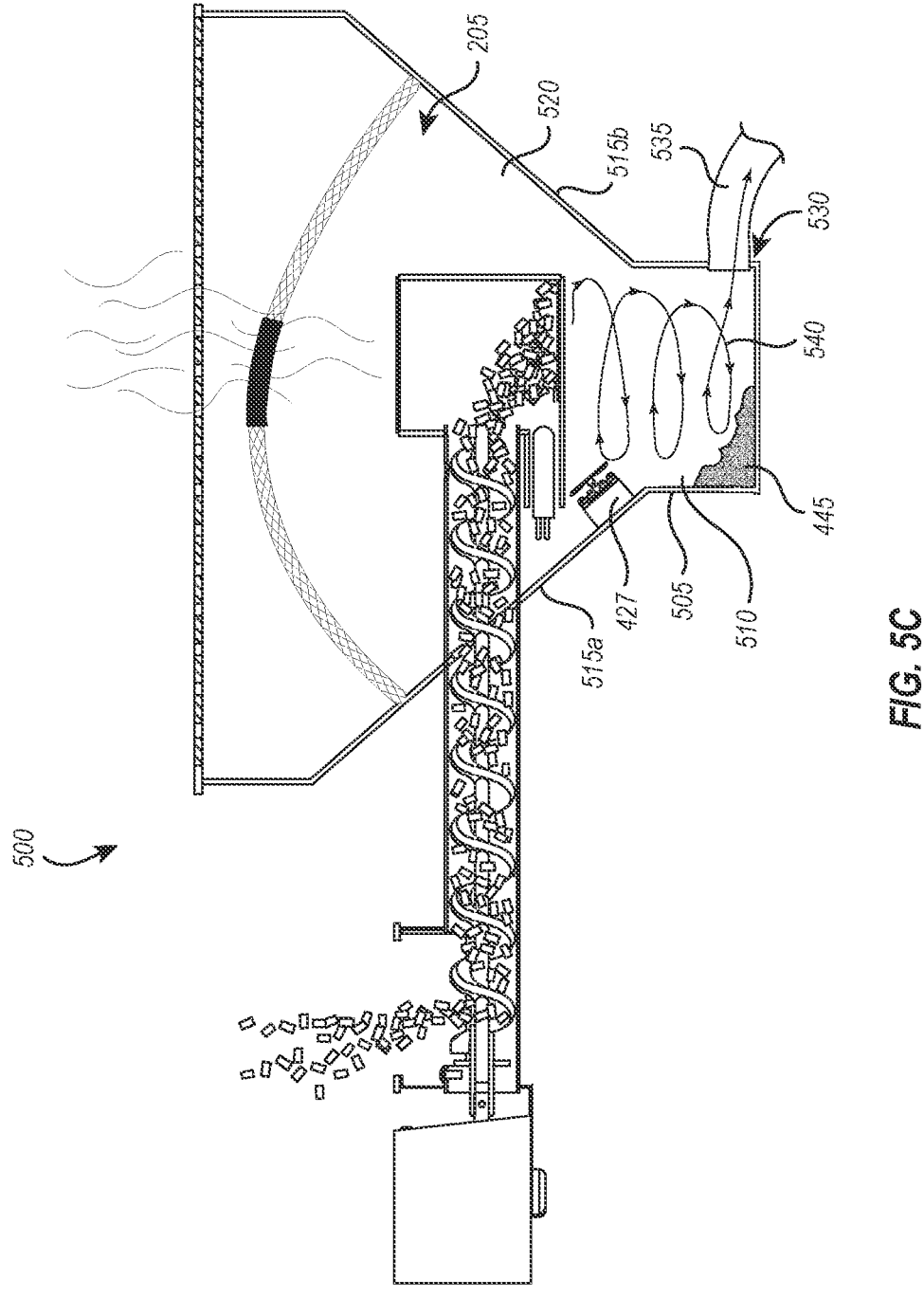
FIG. 5C illustrates a self-cleaning solid fuel grill with a vacuum connected to the evacuation cavity according to an embodiment of the present disclosure.

FIGS. 5A-5C illustrate another embodiment of a self-cleaning grilling device 500. As seen in FIG. 5A, the illustrated embodiment does not include a floor separating the grilling cavity 205 from the evacuation cavity 505. However, in at least one embodiment, the grilling device 500 illustrated in FIGS. 5A-5C includes a floor between grilling cavity 205 and evacuation cavity 505. Such a floor may have passageways extending therethrough and be similar to the floor 315 illustrated in the embodiment shown in FIGS. 4A-4C.

In the embodiment illustrated in FIG. 5A, the grilling cavity 205 includes one or more sidewalls 515a, 515b that at least partially form a funnel 520 between the grilling cavity 205 and the chamber 510 of the evacuation cavity 505. In at least one embodiment, the funnel 520 is conical in shape. In one or more other embodiments, the funnel 520 may have a square cross-section, or other shaped cross-section.

Combustion byproducts 445 emanating from the firepot 300 are blocked by the screen 215 and fall downward, as indicated by the arrows. In addition, byproducts 445 may fall down through the floor and/or sidewalls of the firepot 300, as also indicated by the arrows. In at least one embodiment, the byproducts 445 either fall directly into the chamber 510 of the evacuation cavity 505 or land on the one or more sidewalls 515a, 515b, which guide the byproducts 445 to the chamber 510.

Over time, as shown in FIG. 5B, the byproducts 445 may accumulate in the chamber 510 of the evacuation cavity 505. The evacuation cavity 505 may also include a cap 525 covering an outlet 530 of the chamber 510. The cap 480 (see FIG. 4A) is removably secured over the outlet 530 to prevent insects, spiders, or other unwanted animals and/or debris from entering the chamber 510 of the evacuation cavity 505. In some instances, the byproducts 445 may accumulate enough to extend beyond the chamber 510 of the evacuation cavity 505 and into the grilling cavity 205.

As shown in FIG. 5C, a user can remove the cap 525 and connect a vacuum nozzle 535 to the outlet 530 of the evacuation cavity 505. The arrows 540 indicate the path taken by the byproducts 445 when the vacuum nozzle 535 creates a vacuum within the chamber 510 of the evacuation cavity 505. In particular, the funnel 520 formed by the one or more sidewalls 515a, 515b of the grilling cavity 205 cause the byproducts 445 to exit the grilling cavity 205 in a cyclonic path. The vacuum nozzle 535 creates a vacuum within the evacuation cavity 505 and the grilling cavity 205 to effectively draw out byproducts 445 and clean the grilling device 500.

In addition to embodiments of the various grilling devices 400, 500 described herein, at least one embodiment of a grilling device 400, 500 includes a scraper that runs down the sidewalls 515a, 515b and/or floor 315 of the grilling device 400, 500. In at least one embodiment, the scraper pushes ash from the grilling cavity 205 to the chamber 470 of the evacuation cavity 455. In at least one embodiment, the scraper is automated. In at least one other embodiment, the scraper is actuated manually by a user. In at least one embodiment of a grilling device 400, 500, the scraper adds to the cleaning functionality of the vacuum nozzles 485, 535 described herein by pushing more byproduct 445 into the evacuation cavity 455, 505 to be sucked out the outlet 475, 530.

Figure 6:
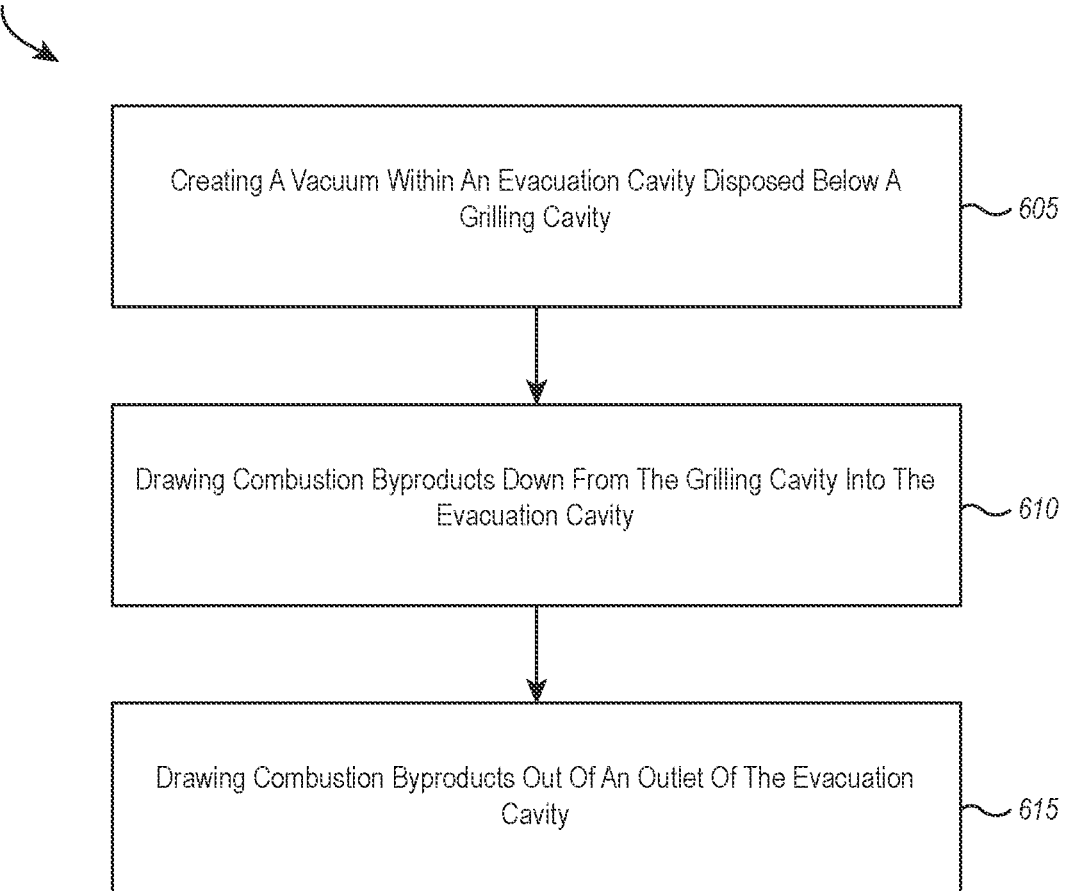
FIG. 6 is a flowchart illustrating a method of cleaning a grilling device according to an implementation of the present disclosure.

Accordingly, as outlined in FIG. 6, a method 600 of cleaning a grilling device includes a first step 605 of creating a vacuum within an evacuation cavity disposed below a grilling cavity. In at least one embodiment, the first step 605 includes connecting a vacuum nozzle 485, 535 the outlet 475, 530 of the evacuation cavity 455, 505, as shown in FIGS. 4C and 5C.

Another step 610 includes drawing combustion byproducts down from the grilling cavity into the evacuation cavity. Step 610 comprises drawing byproducts 445 through passageways 320 in the floor 315 of the grilling cavity 205, as shown in FIGS. 4A and 4B and/or guiding byproducts 445 down the funnel 520 formed by the sidewalls 515a, 515b of the grilling cavity 205, as shown in FIGS. 5A and 5B.

In at least one embodiment, another step 615 includes drawing combustion byproducts out of an outlet of the evacuation cavity. Step 615 includes connecting a vacuum nozzle 485, 535 to the outlet 475, 530 of the evacuation cavity 455, 505, as shown in FIGS. 4C and 5C.

As described above, at least one embodiment of a self-cleaning grill includes a blower 427 that blows byproducts 445 out from the firepot 300, as described above. However, in some cases, some byproducts 445 can remain within the firepot 300 even if the blower 427 circulates air therethrough. The byproducts 445 that remain in the firepot 300 can decrease the efficiency of fuel combustion in the firepot 300. Certain features of the firepot 300 described herein can mitigate or eliminate the build-up of byproducts 445 within the firepot 300.

For example, FIGS. 7A and 7B illustrate an embodiment of a firepot 700 that has features to reduce the number of byproducts 445 that accumulate in the firepot 700. FIG. 7A illustrates a perspective view of such a firepot 700 and FIG. 7B illustrates a top view. The firepot 700 includes a cylindrical cavity that is open at the top 705. In at least one embodiment, the firepot 700 also includes an opening 710 in the side of the firepot 700 configured to receive fuel, such as wood pellets, into the firepot 700. An auger or other delivery system can push/feed fuel into the firepot 700 through this opening 710.

In at least one embodiment, a firepot 700 optionally includes one or more ventilation holes 715 in the sidewalls 720 of the firepot 700. The ventilation holes 715 allow air to flow into the firepot 700 to facilitate combustion of fuel in the firepot 700. The ventilation holes 715 may also allow byproducts 445 from spent fuel pellets to exit the firepot 700. The ventilation holes 715 therefore reduce the amount of byproducts 445 that accumulate inside the firepot 700. One or more other embodiments of a firepot 700 may include more or less than the five ventilation holes 715 illustrated in the embodiment shown in FIG. 7A.

The diameter and shape of the ventilation holes 715 can also vary in one or more other embodiments. In one embodiment, for example, the ventilation holes 715 have a diameter of $\frac{1}{16}$". In one or more other embodiments, the ventilation holes 715 may have a diameter of $\frac{1}{8}$-inch or $\frac{1}{4}$-inch. In at least one other embodiment, the ventilation holes 715 may even be $\frac{1}{3}$ or $\frac{1}{2}$-inch in diameter or higher. Also, the size and shape of the ventilation holes 715 may vary as noted above within the same firepot 700.

Additionally, or alternatively, in at least one embodiment, the firepot 700 includes a perforated floor 725. The perforated floor 725 comprises a plurality of bottom ventilation holes 730 disposed in the floor 725 of the firepot 700. The number, size, and pattern of the bottom ventilation holes 730 can vary in one or more other embodiments of the firepot 700.

In at least one embodiment, for example, the bottom ventilation holes 730 have a diameter of $\frac{1}{32}$-inch or $\frac{1}{16}$-inch. In one or more other embodiments, the bottom ventilation holes 730 may be $\frac{1}{8}$-inch or $\frac{1}{4}$-inch. In at least one embodiment, the bottom ventilation holes 730 may even be $\frac{1}{3}$ or $\frac{1}{2}$ inch in diameter or higher. In addition, the manufacturer may randomly distribute dozens of holes in no particular order, or order a few or many holes into a particular pattern designed to optimize the characteristics of the grill.

However configured, the bottom ventilation holes 730 allow air to enter the firepot 700 to facilitate fuel combustion, as described above. The bottom ventilation holes 730 also allow combustion byproducts to fall through the floor 725 of the firepot 700 and onto the floor 315 of the grilling cavity 205.

In at least one embodiment, the firepot 700 includes a landing zone 735. The landing zone 735 is a portion of the perforated floor 725 that does not have bottom ventilation holes 730. Again, the bottom ventilation holes 730 can let air through the floor 725 of the firepot 300, which can disturb fuel, such as wood fuel pellets, residing inside the firepot 700. This circulating air may cause the fuel to move around or circulate within the firepot 700. Accordingly, the landing zone 735 provides an area on the floor 725 where fuel pellets can accumulate around a heating element without being displaced by the circulating air.

In one embodiment, the landing zone 735 resides near the heating element so that fuel pellets can accumulate at the landing zone 735 without the circulating air disturbing the fuel pellets, as described above. The landing zone 735 can provide a portion of the floor 725 where the fuel pellets can rest in contact with or near the heating element. The landing zone 735 is therefore advantageous for facilitating the ignition of fuel inside the firepot 700.

In addition, at least one embodiment of the firepot 700 also includes one or more walls 740 extending at least partially around the landing zone 735. In one embodiment, for example, the walls 740 may include a number of separate walls 740 that partially surround the landing zone 735. In at least one other embodiment, the wall 740 may be a single continuous wall 740 that surrounds the entire landing zone 735 or just a portion of the outer perimeter of the landing zone 735. In any case, the walls 740 surrounding the landing zone 735 may present a barrier to fuel pellets escaping the landing zone 735 due to circulating air or other fuel pellets dropping on each other as they enter the firepot 700.

The various embodiments of a self-cleaning solid fuel grills described herein represent only a few of the many embodiments of a self-cleaning solid fuel grill. For example, at least one embodiment of a self-cleaning solid fuel grill includes more than one evacuation cavity in communication with the grilling cavity. One or more other embodiments may include an evacuation cavity that includes an outlet configured to be permanently connected to a vacuum nozzle. In such an embodiment, a user can remove combustion byproducts by simply turning on the vacuum without connecting the vacuum nozzle to an outlet of the evacuation cavity.

Yet other embodiments may include one or more sensors within the grilling cavity and/or evacuation cavity to detect the amount of accumulated byproduct present in the grilling cavity and/or evacuation cavity. The one or more sensors can then relay a message to the user or automatically initiate suction of a vacuum to draw the ash out of the grilling cavity and/or evacuation cavity.

In at least one embodiment, a firepot includes a floor comprised of a mesh material rather than a solid material with ventilation holes formed therethrough. The mesh material can be configured to allow a blower to circulate air and allow combustion byproducts to fall through the mesh and onto the floor of the grilling cavity, while still holding fuel pellets. In yet another embodiment, a firepot may include a trap door that a user opens to empty ash from the firepot. A motor can open the trap door automatically when the vacuum nozzle is connected to the outlet of the evacuation cavity, or a user can manually open the trap door when necessary to clean out the combustion byproducts.

The present disclosure can be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A grilling device, comprising:
 a grilling cavity comprising a firepot;
 a grilling chamber overlying the grilling cavity;
 an evacuation cavity underlying the grilling cavity and in communication with the grilling cavity;
 a floor separating the grilling cavity from the evacuation cavity;
 one or more passageways extending through the floor, wherein the one or more passageways comprise a first opening on a top side of the floor facing the grilling cavity and a second opening on a bottom side of the floor facing the evacuation cavity, the second opening being relatively larger than the first opening, and wherein the one or more passageways are configured to amplify a suction force imparted to the evacuation cavity to draw combustion byproducts retained below a screen through the one or more passageways and into the evacuation cavity; and the screen laterally surrounding the firepot, wherein the grilling cavity comprises converging sidewalls configured to convey the combustion byproducts to the evacuation cavity; and wherein the screen extends to the converging sidewalls of the grilling cavity and comprises a heat shield underlying a cooking surface of the grilling chamber.

2. The grilling device of claim 1, wherein the screen is configured to prevent ash and debris from entering the grilling chamber by filtering air moving from the grilling cavity to the grilling chamber to allow smoke to move into the grilling chamber while retaining the ash and debris below the screen.

3. The grilling device of claim 1, wherein at least a portion of the screen extends beyond a lower boundary of the firepot.

4. The grilling device of claim 1, further comprising openings in a bottom surface of the firepot, the openings configured allow combustion byproducts to exit the firepot and to enter the evacuation cavity through additional openings in the floor.

5. The grilling device of claim 4, wherein the additional openings in the floor are relatively larger than the openings in the bottom surface of the firepot, the additional openings configured to allow the combustion byproducts to be carried by air circulating therethrough.

6. The grilling device of claim 4, further comprising ventilation holes in sidewalls of the firepot, the ventilation holes configured to allow air to flow into the firepot and to allow the combustion byproducts to exit the firepot through the ventilation holes.

7. The grilling device of claim 1, further comprising a fan adjacent to the firepot and beneath the screen, the fan configured to circulate air throughout the grilling cavity and around the firepot.

8. The grilling device of claim 1, further comprising a solid fuel portal at least partially within the grilling cavity, wherein one or more of the solid fuel portal and the firepot are spaced apart from the floor.

9. A grilling device, comprising:

a grilling cavity comprising a floor defining a bottom thereof;

a firepot within the grilling cavity;

a screen at least partially laterally surrounding and remote from sidewalls of the firepot;

an evacuation cavity below the firepot and in communication with the grilling cavity; and one or more passageways extending through the floor, wherein the one or more passageways comprise a first opening on a top side of the floor facing the grilling cavity and a second opening on a bottom side of the floor facing the evacuation cavity, the second opening being relatively larger than the first opening, and wherein the one or more passageways comprise two or more conical-shaped funnels configured to amplify a suction force imparted to the evacuation cavity to draw combustion byproducts retained below the screen through the one or more passageways and into the evacuation cavity, wherein the grilling cavity comprises converging sidewalls configured to convey the combustion byproducts to the evacuation cavity and the screen extends to the converging sidewalls of the grilling cavity.

10. The grilling device of claim 9, further comprising throughholes in a bottom surface of the firepot, the bottom surface of the firepot overlying and spaced apart from the floor.

11. The grilling device of claim 10, wherein at least some of the throughholes in the bottom surface of the firepot are vertically aligned with individual passageways of the one or more passageways.

12. The grilling device of claim 10, further comprising a heating element adjacent to the firepot, wherein the firepot comprises a landing zone in the bottom surface thereof, the landing zone separated from the throughholes by barrier walls configured to retain at least a portion of a solid fuel adjacent to the heating element.

13. The grilling device of claim 9, wherein the one or more passageways are beneath the screen, and wherein the grilling cavity and the evacuation cavity are in communication with one another through the one or more passageways.

14. The grilling device of claim 9, further comprising a fuel delivery system adjacent to the firepot, wherein at least a portion of the fuel delivery system is beneath the screen.

15. The grilling device of claim 9, wherein the screen comprises a metal mesh material, a woven fabric, a porous material, or a combination thereof.

16. The grilling device of claim 9, wherein the evacuation cavity comprises an opening at an elevational level below the one or more passageways for removing the combustion byproducts from the evacuation cavity.

* * * * *